United States Patent
Bair et al.

(10) Patent No.: US 6,428,589 B1
(45) Date of Patent: Aug. 6, 2002

(54) TWO-STAGE PARTICLE SEPARATOR FOR VACUUM CLEANERS

(75) Inventors: Kenneth W. Bair, Akron; Victor R. Younger, Parma, both of OH (US)

(73) Assignee: Royal Appliance Mfg. Co., Glenwillow, OH (US)

(*) Notice: Subject to any disclaimer, the term of this patent is extended or adjusted under 35 U.S.C. 154(b) by 3 days.

(21) Appl. No.: 09/676,650

(22) Filed: Sep. 29, 2000

(51) Int. Cl.⁷ .................. A47L 9/16; B01D 50/00; B01D 45/12
(52) U.S. Cl. .............. 55/318; 55/396; 55/439; 55/457; 55/DIG. 3; 15/353
(58) Field of Search .............. 55/342, 345, 318, 55/392, 394, 396, 429, 439, 457, DIG. 3, DIG. 14; 15/350, 352, 353

(56) References Cited

U.S. PATENT DOCUMENTS

| | | |
|---|---|---|
| 17,675 A | 6/1857 | Hale |
| 1,029,214 A | 6/1912 | Morse |
| 3,371,471 A | 3/1968 | Connors |
| 3,517,821 A | 6/1970 | Monson et al. |
| 4,172,710 A * | 10/1979 | van der Molen .............. 15/353 |
| 4,289,611 A | 9/1981 | Brockmann |
| 4,643,158 A | 2/1987 | Giannotti |
| 4,895,582 A | 1/1990 | Bielefeldt |
| 4,985,058 A | 1/1991 | Prinsloo et al. |
| 5,180,407 A | 1/1993 | DeMarco |
| 5,262,046 A | 11/1993 | Forgac et al. |
| 5,498,273 A | 3/1996 | Mann |
| 5,542,380 A | 8/1996 | Chatten |
| 5,690,709 A | 11/1997 | Barnes |
| 5,720,243 A | 2/1998 | Stegemyr et al. |
| 5,815,881 A | 10/1998 | Sjögreen |
| 6,083,292 A | 7/2000 | Fumagalli |
| 6,334,234 B1 * | 1/2002 | Conrad et al. .............. 15/347 |

OTHER PUBLICATIONS

Aerospace Research Laboratories, Dr. A. C. Pinchak, "A Review Of The State Of The Art Of Clyclone–Type Separators", ARL 67–0047, pp.1–58, Mar. 1967.

Chemical Age of India, "Rajagopalan & Basu:Theory and Design Of Cyclones", vol. 27, No. 1, pp. 42–55, Jan. 1976.

* cited by examiner

Primary Examiner—Robert A. Hopkins
(74) Attorney, Agent, or Firm—Fay, Sharpe, Fagan, Minnich & McKee, LLP

(57) ABSTRACT

A vacuum cleaner includes a housing and a nozzle in fluid communication with the housing. A suction source is held by the housing. The nozzle is in fluid communication with the suction source. A dust cup is selectively secured to the housing. The dust cup includes an inlet in fluid communication with the nozzle and a first inertial dust separation stage positioned downstream from the inlet. A first dust containing chamber is located adjacent the first inertial dust separation stage for holding the dust separated by the first inertial dust separation stage. A second inertial dust separation stage is located downstream from the first inertial dust separation stage. A second dust containing chamber is located adjacent the second inertial dust separation stage for holding dust separated by the second inertial dust separation stage. An outlet is located downstream from the second inertial dust separation stage. The dust cup can be selectively removed from the housing for emptying.

27 Claims, 11 Drawing Sheets

TWO-STAGE PARTICLE SEPARATOR FOR VACUUM CLEANERS

BACKGROUND OF THE INVENTION

This invention pertains to vacuum cleaners. More particularly, this invention relates to a two-stage inertial particle separator for vacuum cleaners.

Cyclone separators remove solid particles such as dust from a flow of air or other gas by subjecting the flow to a spiral-like motion during which centrifugal force urges the denser particles to move outwardly with respect to the gas in which they are suspended. Cyclonic particle separators are known in a variety of environments. For example, air precleaners are used for removing particles from the air prior to introducing the air, through an air cleaner or filter, to a carburetor or an air intake structure of an internal combustion engine. In the petroleum industry, fine catalyst dust is separated from the large stream of hot flue gas leaving a regenerator vessel of a fluid catalytic cracking unit by centrifugal separation apparatus. Cyclonic separators are also employed to separate solid particles from a flow of gas in a variety of other environments.

Conventional vacuum cleaners employ a filter bag for separating dirt and dust entrained in air which is picked up by a suction nozzle of the vacuum cleaner. More recently, cyclonic vacuum cleaners have become known. In these devices, one or more cyclones are employed to separate dirt and dust particles from the air. The dirt laden air enters the top of a dust canister tangentially and is caused to swirl. The larger particles fall to the bottom of the canister. The airflow then rises along the longitudinal axis of the canister towards a cap that is connected to a U-shaped tube. The U-shaped tube redirects the airflow enabling it to tangentially enter an inner cyclone having a frusto-conical shape. The air is then caused to swirl again and smaller dust particles which remain entrained in the air will fly radially outwardly and slide downwardly along the walls of the inner frusto-conical chamber to a dust collecting chamber at the bottom. One known such vacuum cleaner is disclosed in U.S. Pat. No. 4,853,011. However, this known cyclonic vacuum cleaner design is not optimum.

Another known vacuum cleaner employing cyclonic airflow is disclosed in U.S. Pat. No. 3,877,902. This vacuum cleaner, which is a wet/dry tank type cleaner has a container with an upper part provided with an inlet opening for dust laden air or liquid and a discharge opening for clean air. A lower part of the container collects separated dust or separated liquid. A generally vertically disposed cyclone separation unit is located in the container and is operatively connected to the inlet opening. A motor fan unit provided in the container moves air through the container. A filter is mounted between the cyclone separator and the motor fan unit so that air flows out of the cyclone separator unit through the filter and to the motor fan unit. This known cyclonic flow vacuum cleaner also does not have an optimum design.

Another known cyclonic flow vacuum cleaner is illustrated in U.S. Pat. No. 3,425,192. That device shows what appears to be a stationary housing with a three-stage vacuum cleaning system having vertically arranged lower, middle and upper housing sections. Air enters the lower housing section tangentially and is caused to swirl above the open upper end of an inverted frusto-conical member. Heavier dirt and the foreign matter falls downwardly into a relatively large dirt receptacle. Thereafter, the air flows upwardly through a central cylindrical sleeve to the upper ends of a plurality of second stage cyclone separators. In the second stage, a plurality of helical vanes cause the dirt to swirl in a downward helical direction within tubular members. Finer dirt and foreign matter particles fall downwardly into a second dirt collecting pan. The now twice-cleaned air is pulled upwardly through central tubes and through a final filter sheet. Thereafter, the air is pulled through a vacuum pump and discharged from the vacuum cleaning system. This system is disadvantageous from the standpoint that it is very large and appears to be designed for stationary whole house vacuum systems instead of ambulatory vacuum cleaners.

Another known cyclonic vacuum cleaner is disclosed in European Publication No. EP 0 885 585 A1. This patent document relates to a multi-stage vortex arrangement with a built-in recirculation or feedback loop. In a first stage cyclone separator, approximately 90% of the dirt and other particles is spun out. Semi-clean air is then drawn into a second stage involute separator which induces a high velocity vortex to concentrate finer dirt particles into about 20% of the airflow. That portion of the airflow is then cleaned using a third stage miniature cyclone. Transport air from the third stage is vented to an outlet port along with the second stage outlet air. This design is disadvantageous as being too complex.

Accordingly, it has been considered desirable to develop a new and improved vacuum cleaner which would overcome the foregoing difficulties and others while providing better and more advantageous overall results.

BRIEF SUMMARY OF THE INVENTION

A vacuum cleaner for centrifugally separating dirt from the air in which it is entrained is provided.

More particularly, the vacuum cleaner comprises a housing having a separation chamber and a nozzle communicating with the separation chamber. An air path directs the dust entrained air to the separation chamber. The separation chamber has two stages. The first stage is formed by a housing having an airflow path which guides dust entrained air in a substantially circular flowpath. The flowpath has a radially inner opening through which air that has been separated from heavier dust particles enters the second stage. The heavier dust particles continue along the substantially circular flowpath and fall into a first portion of a dust container. The second stage includes a centrally positioned hub and a plurality of vanes extending radially outward from the hub. The vanes cause the air to swirl. In the second stage the lighter dust particles still remaining entrained in the air are flung radially outwardly and fall into a second portion of the dust container. The now twice-cleaned air flows axially downward and radially inward to exit through an outlet tube out of the dust container.

According to another embodiment of the present invention, a vacuum cleaner is provided.

In accordance with this aspect of the invention, the vacuum cleaner comprises a housing and a nozzle in fluid communication with the housing. A suction source is held by the housing and the nozzle is in fluid communication with the suction source. A dust cup is selectively secured to the housing. The dust cup comprises an inlet in fluid communication with the nozzle, a first inertial dust separation stage positioned downstream from the inlet and a first dust containing chamber located adjacent the first inertial dust separation stage for holding the dust separated by the first inertial dust separation stage. A second inertial dust separation stage is located downstream from the first inertial dust separation stage. A second dust containing chamber is located adjacent the second inertial dust separation stage for holding dust separated by the second inertial dust separation stage. An outlet is located downstream from the second inertial dust separation stage.

One advantage of the present invention is the provision of a new and improved vacuum cleaner which can be a tank type cleaner, a canister cleaner, an upright cleaner or even a central vacuum cleaner.

Another advantage of the present invention is the provision of a two-stage inertial particle separator for a vacuum cleaner. In a first particle separation stage, heavier dust particles are separated from air which is caused to flow radially inwardly. In a second particle separation stage, the remaining dust particles are caused to move radially outwardly while the now twice-cleaned air flows towards a central axial opening.

Still another advantage of the present invention is the provision of a vacuum cleaner in which two stages of inertial separation take place in a selectively removable dust container, thereby eliminating the need for a filter bag. Such inertial separation can be caused by sudden changes in the direction of air flow, by a rotation of the air as it flows caused either by a set of vanes over which the air flows or by a tangential inlet opening for air flowing into a chamber.

Yet another advantage of the present invention is the provision of a vacuum cleaner with a two stage inertial particle separation system in which a first separation stage includes a set of louvers located in an opening positioned radially inwardly from an air flow path. The direction of air flow is suddenly changed by the opening and the louvers but centrifugal force exerted on particles entrained in the air prevents the particles from entering the second stage through the set of louvers as the air enters.

Still yet another advantage of the present invention is the provision of a vacuum cleaner with a two stage inertial particle separation system in which a second stage includes a deflector with a set of vanes which causes air to spin urging entrained particles radially outwardly while air leaves via a centrally located air exit tube spaced from the deflector.

An additional advantage of the present invention is the provision of a vacuum cleaner having a dust cup with two chambers. A radially outer chamber holds heavier dust particles separated by the first stage of an inertial particle separation system of the vacuum cleaner. A second radially inner section of the dust cup holds lighter dust particles separated by the second stage of the inertial particle separation system of the vacuum cleaner.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENTS

Figure 1:
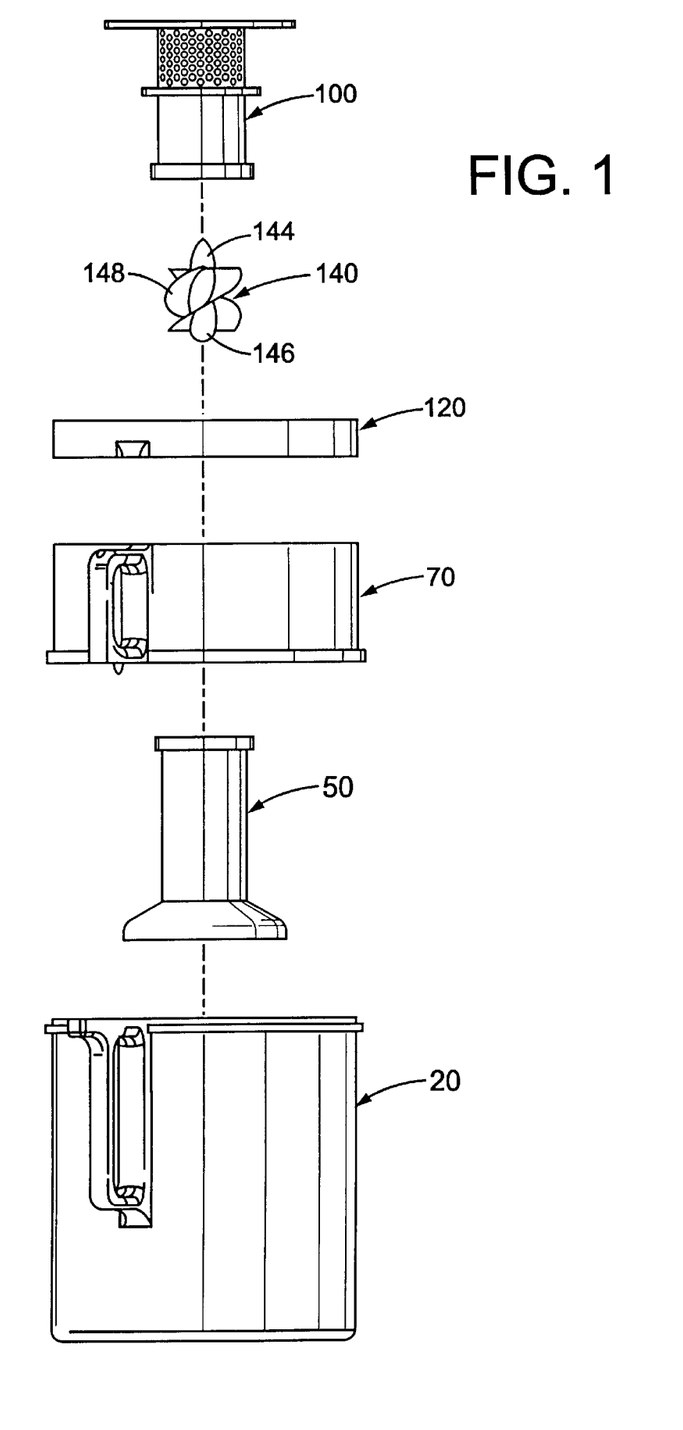
FIG. 1 is an exploded side-elevational view of a vacuum cleaner having a two-stage inertial particle separation system according to the first preferred embodiment of the present invention.
Figure 2:
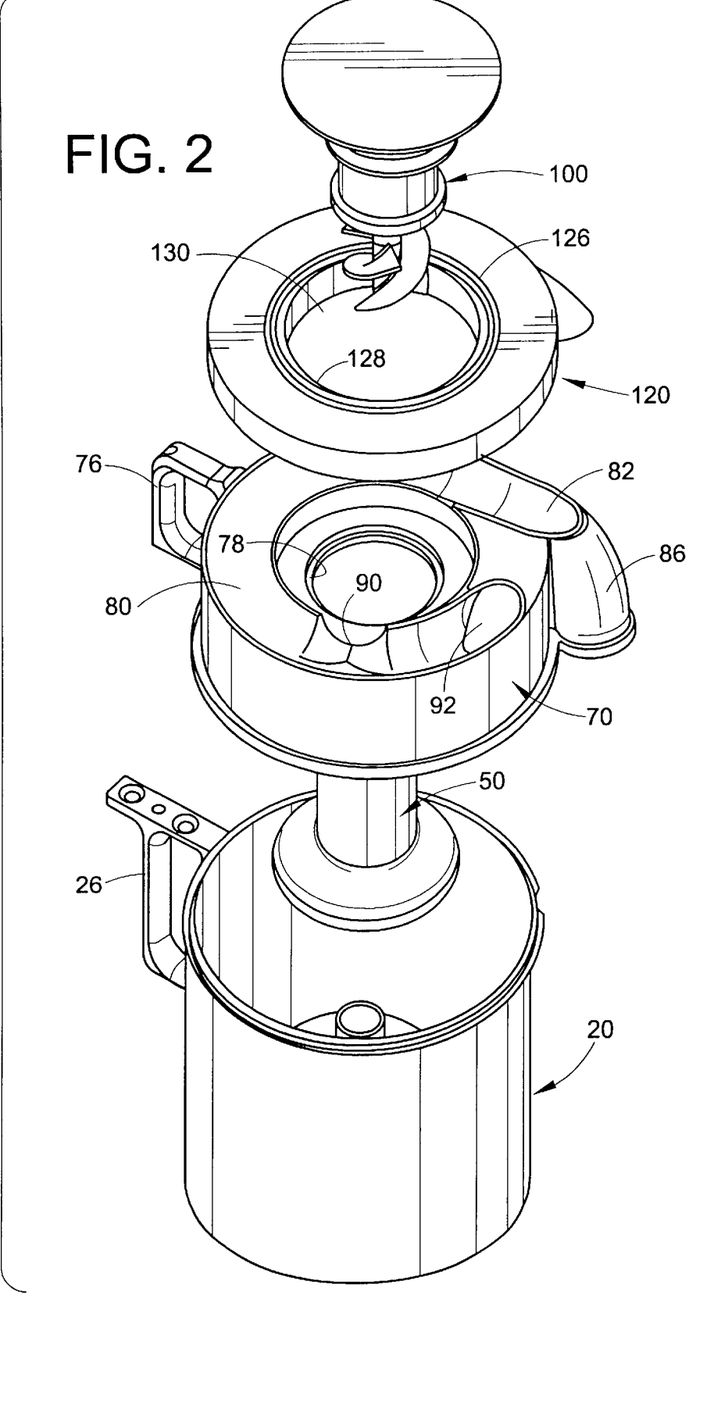
FIG. 2 is an enlarged exploded perspective view of the particle separator of FIG. 1.

Referring now to the drawings wherein the showings are for purposes of illustrating preferred embodiments of the present invention only and not for purposes of limiting same, FIG. 1 shows an exploded side-elevational view of a vacuum cleaner according to a first preferred embodiment of the present invention. While the vacuum cleaner is illustrated to be an upright type hardshell vacuum cleaner, it should be appreciated that the particle separation system disclosed herein could also be employed in a variety of other types of upright vacuum cleaners, as well as canister vacuum cleaners, hand-held portable vacuum cleaners, wet/dry "shop-type" vacuum cleaners or even central vacuum systems. Moreover, the particle separation system disclosed herein could be employed in carpet extractors.

Figure 3:
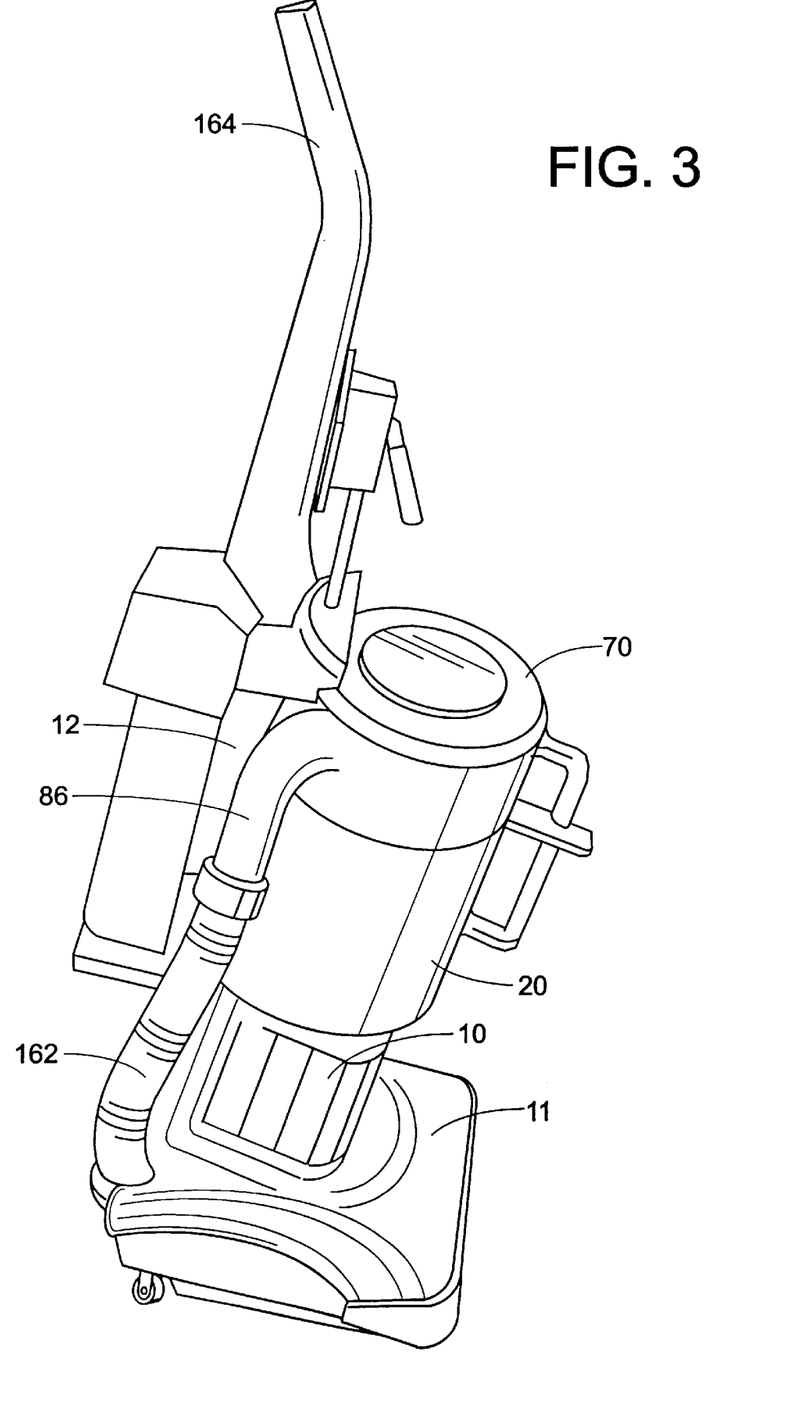
FIG. 3 is a perspective view of the vacuum cleaner of FIG. 1.
Figure 4:
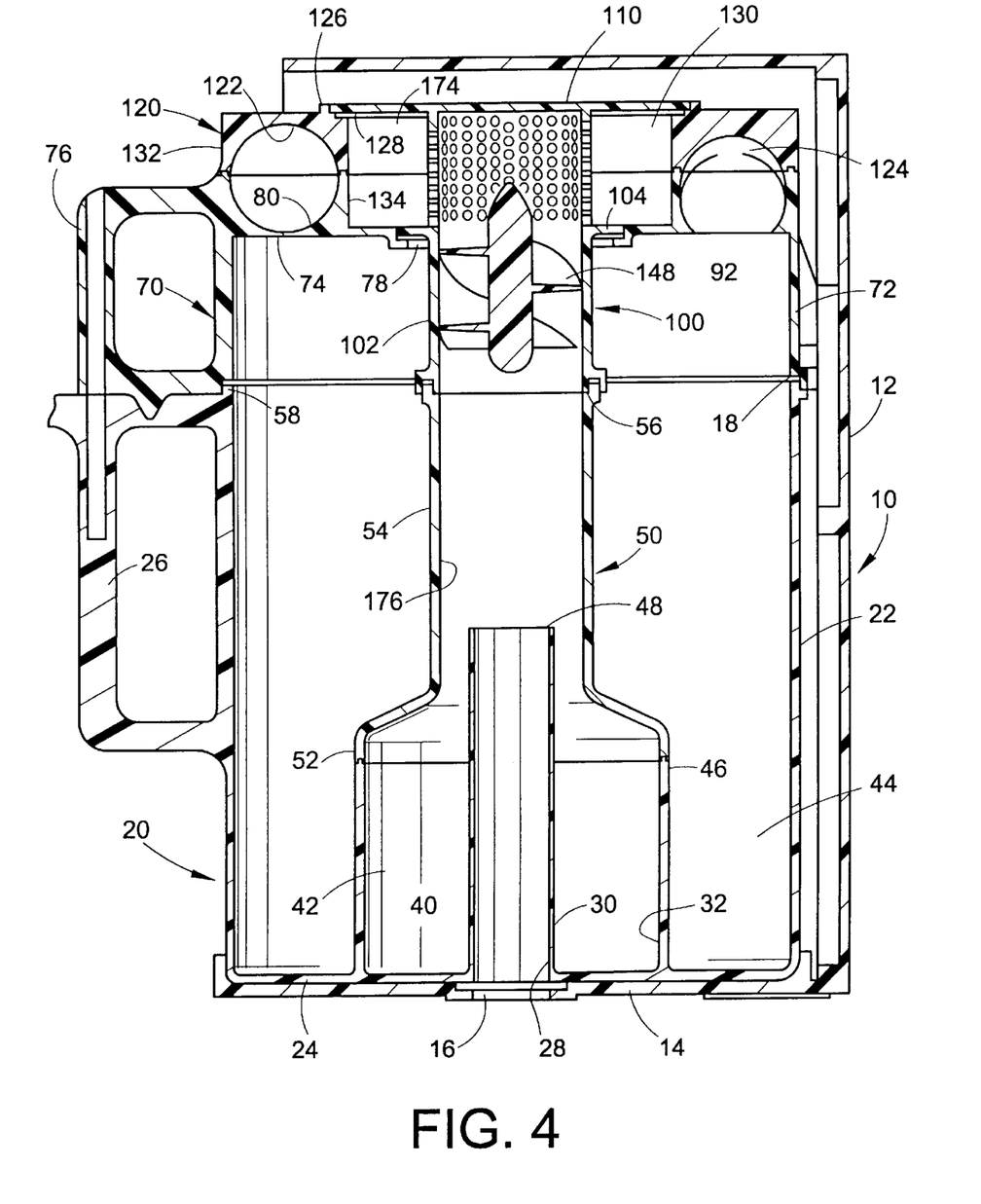
FIG. 4 is a cross-sectional view of the vacuum cleaner of FIG. 3 along line 4–4.

With reference now to FIG. 3, the vacuum cleaner according to the first preferred embodiment comprises a housing 10 mounted on a nozzle base 11. As illustrated in FIG. 4, the housing has a back wall 12 and a bottom wall 14. The bottom wall 14 includes a centrally positioned aperture 16. Selectively held in the housing 10 is a dust cup 20. The dust cup comprises a side wall 22 and a bottom wall 24. A handle 26 extends from the side wall 22 and a central aperture 28 is provided on the bottom wall 24. Extending axially upwardly from the bottom wall into the dust cup is a central cylindrical tube 30. Also extending upwardly from the bottom wall in radially spaced relation to the central tube 30 is a cylindrical outer tube 32. The central or air exit tube 30 defines a central flowpath 40 which communicates with the central aperture 28. It should also be apparent from FIG. 4 that the central aperture 28 of the dust cup 20 is aligned with the central aperture 16 of the housing 10. A first dust containing chamber 42 is defined between the central tube 30 and the outer tube 32. A second dust containing chamber 44 is defined between the outer tube 32 and the side wall 22 of the dust cup 20. In the embodiment disclosed in FIG. 4, an upper end 46 of the outer tube 32 does not extend axially as far up inside the dust cup 20 as does an upper end 48 of the central tube 30.

A connecting conduit 50 has an enlarged diameter lower end 52 which is seated upon the upper end 46 of the outer tube 32. The connecting conduit has a reduced diameter central portion 54 and an upper end 56 which is located in the same plane as an upper end 58 of the dust cup 20.

Positioned atop the dust cup 20 is a first separator housing section 70. The first separator housing section comprises a side wall 72 and a top wall 74. Mounted on the side wall 72 is a handle 76. Located on the top wall 74 is a central aperture 78. Defined in the top wall 74 is a trough 80 which has a substantially semi-circular shape over most of its length.

Figure 5:
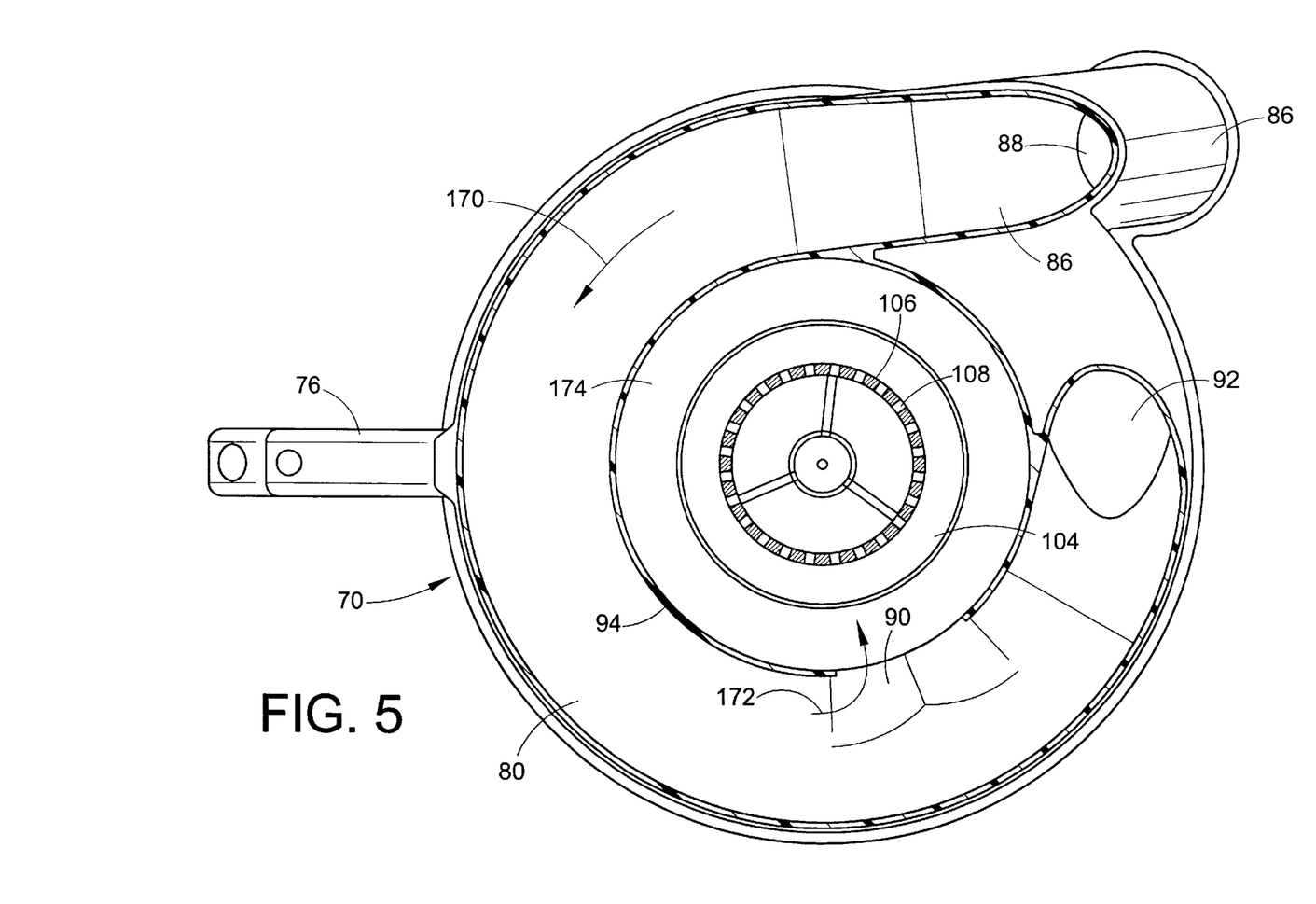
FIG. 5 is an enlarged cross-sectional view of a portion of the vacuum cleaner of FIG. 4.

With reference now to FIG. 5, the trough includes a tubular wall section 86 with an inlet port 88. Communicating with the trough 80 is a first outlet port 90 defined on a radially inner periphery of the trough. Also communicating with the trough 80 is a second outlet port 92 which is aligned with the walls of the trough.

Located radially inwardly from the trough 80 is a recessed portion 94 of the top wall 74. With reference again to FIG. 4, the top wall terminates in a radially inwardly extending flange 96 which surrounds the central aperture 78 extending through the top wall 74 of the first separator housing section 70.

Extending through the central aperture 78 is a portion of a second separator housing section 100, which can be termed a vortex separator. More specifically, a lower portion 102 of the second separator housing section extends through the central aperture 78 while a flange 104 of the second separator housing section is seated on the flange 96 of the top wall 74 of the first separator housing section 70. Extending above the flange 104 is an upper portion 106 of the second separator housing section 100. A plurality of apertures 108 are formed in the upper section so that the upper section takes the form of a screen. Finally, the second separator housing section includes an enlarged top end 110 above the upper section 106.

A toroidal lid 120 is selectively seated on the first separator housing section 70. The lid includes a downwardly facing substantially semi-circular trough 122 which is aligned with the trough 80 of the separator housing 70 as is evident from FIG. 4. The trough 122 has a reduced area portion 124 at the location of the second outlet port 92 of the trough 80. A rib 126 extends axially upward from the lid 120 and circumferentially around the lid. The rib 126 is sized so as to accommodate the enlarged top end 110 of the second separator housing section 100. Positioned radially inwardly from the rib 126 is a recess 128 which leads to a central opening 130 defined in the lid 120. Thus, the lid has a radially outer wall 132 and a radially inner wall 134 encircling the opening 130.

Positioned in the lower section 102 of the housing 100 is a deflector 140 (FIG. 1). The deflector includes a hub 142 having a leading edge 144 and a trailing edge 146. In the embodiment illustrated, the leading edge is streamlined and the trailing edge is generally semicircular (ellipsoidal) in shape. The hub 142 has a plurality of generally helical shaped vanes 148 radiating outwardly therefrom in circumferentially spaced orientations. Each of the vanes 148 has an outer edge 150 contacting an inner surface of the housing lower section 102 and an inner edge 152 affixed to the hub 142. Each of the vanes 148 has an upper surface 154 directed generally toward the upstream end of the deflector 140 and a lower surface 156. The upper surface 154 can be termed a high pressure surface because fluid approaching the deflector 140 strikes the surface 154 and is deflected in a generally spiral path thereby.

With reference now to FIG. 3, the nozzle base 11 of the vacuum cleaner has an inlet port leading to an axially extending conduit 162 which communicates with the suction nozzle of the vacuum cleaner. A handle 164 extends upward from the housing to allow manipulation of the vacuum cleaner. Air entrained dirt and dust particles and other items picked up by the suction nozzle such as lint, hair and the like, pass through the inlet port, travel upwardly in the conduit 162 and enter the inlet port 88 (FIG. 5) of the first separator housing section 70 and enter the trough 80. As best illustrated in FIG. 5, the air entrained dirt, fibers and the like travel counter-clockwise along a path illustrated by arrow 170 in a swirling motion. Since a suction is drawn by a suitable motor fan (not illustrated) of the vacuum cleaner at central aperture 16 as illustrated in FIG. 4, air is pulled radially inwardly from the trough 80 at the first outlet port 90. However, the heavier dirt and dust particles and the like will continue to travel in the trough 80 exiting at the second outlet port 92. As best illustrated in FIG. 4, these particles will then fall down into the dust cup 20. More specifically, these particles will fall into the second dust containing chamber 44 thereof.

Meanwhile, the now somewhat cleaned air flows radially inwardly as shown by arrow 172 into a toroidal chamber 174 which, as best shown in FIG. 4, is defined by the recessed portion 94 and flange 96 of the first separator housing section 70, the inner wall 134 of the lid 120 and the flange 104 and enlarged top end 110 of the second separator housing section 100. The air then flows through the apertures 108 of the upper section 106 of the second separator housing section 100 and encounters the deflector 140 (FIG. 1). The spiraling vanes 148 of the deflector (as best shown in FIG. 1) cause the air to swirl. Any dirt or dust which remains entrained in the air is caused to travel radially outwardly by centrifugal force. Such dirt and dust then falls axially downwardly along an inner surface 176 of the connecting conduit central portion 54 and into the first dust containing chamber 42 of the dust cup 20. The now twice-cleaned air exits the connecting conduit 50 at the upper end 48 of the inner tube 40 and subsequently flows through the central aperture 28 thereof and then through the central aperture 16 of the bottom wall 14 of the vacuum cleaner housing 10. The air then flows towards the motor/fan of the vacuum cleaner.

In order to clean the dust cup 20, the first separator housing section 70 is lifted away from the dust cup. Thereafter the dust cup can be inverted to empty both the first dust containing chamber 42 and the second dust containing chamber 44. If desired, the connecting conduit 50 can be removed so as to enable the first dust containing chamber 42 to be more easily emptied.

Preferably, the dust cup 20, the first separator housing section 70, the second separator housing section 100, lid 120 and deflector 140 are made out of a suitable conventional material such as a plastic. It would be advantageous to make the dust cup 20 from a transparent material so as to allow the user of the vacuum cleaner to ascertain whether the dust cup is full and needs to be emptied.

It has been found that the manufacture of at least the first separator housing section 70 and lid 120 from a thermoplastic material is advantageous because the complex geometries of these two elements can be more easily formed from a conventional thermoplastic material in a cost efficient manner than they can from metal.

The deflector 140 is preferably made of a suitable thermoplastic material for ease of manufacture. While the deflector 140 can be suitably secured in the lower section 102 such as by e.g. adhesive or sonic welding, it may be advantageous to allow selective removability of the deflector for cleaning purposes. Thus, the deflector 140 is preferably friction fit in the lower section 102 of the second separator housing section 100.

It should be appreciated that the entire two-stage particle separator assembly can be removed from the housing 10 of the vacuum cleaner simply by grasping the pair of aligned handles 26 and 76 as best illustrated in FIG. 3.

It should also be appreciated that the first separator housing section 70 and 120 comprises the first stage of particle separation, whereas the second separator housing section 100 comprises the second stage of particle separation.

The central tube 30 or exit tube separates dust from air by centrifugal force which is applied to particles by the deflector 140 (FIG. 1) which causes the air and entrained particles to rotate. Centrifugal force moves the particles radially outwardly against the wall of the tube 30 while air escapes through the center of the tube. As such, the operational parameter most important to the proper operation of the instant particle separator is the velocity of the particles. This is directly proportional to the velocity of the air at the outlet 16.

That velocity is, in turn, a function of the quantity of air flowing through the particle separator as measured in cubic feet per minute and the area of the flowpaths in the first and second separator housing sections 70, 120 and 100. Ensuring that the velocity of air is high enough through the particle separator becomes a major parameter for the proper operation of this particle separator.

The typical operating velocity of the particle separator is approximately 166 feet per second (9960 feet per minute). The diameter of the central cylindrical tube determines the amount of air which can flow through the tube. Of importance is the relationship between the diameters of the central tube 30 and the connecting conduit 50. Also of importance is the distance between the inlet 48 of the central tube 30 and the bottom end of the deflector 140.

Another ratio which is important is the distance between the inlet 48 of the central tube 30 and the lower enlarged end of the connecting conduit 50. In one preferred embodiment, the inlet 48 of the central tube 30 is located approximately one inch above the enlarged diameter lower end 52 of the connecting conduit 50. The distance between the inlet 48 of the central tube 30 and the lower end of the deflector 140 is preferably approximately 2.8 times the diameter of the central tube 30. The diameter of the connecting conduit 50 should be preferably approximately 1.4 times the inside diameter of the central tube 30 plus the wall thickness of the central tube 30.

Figure 6:
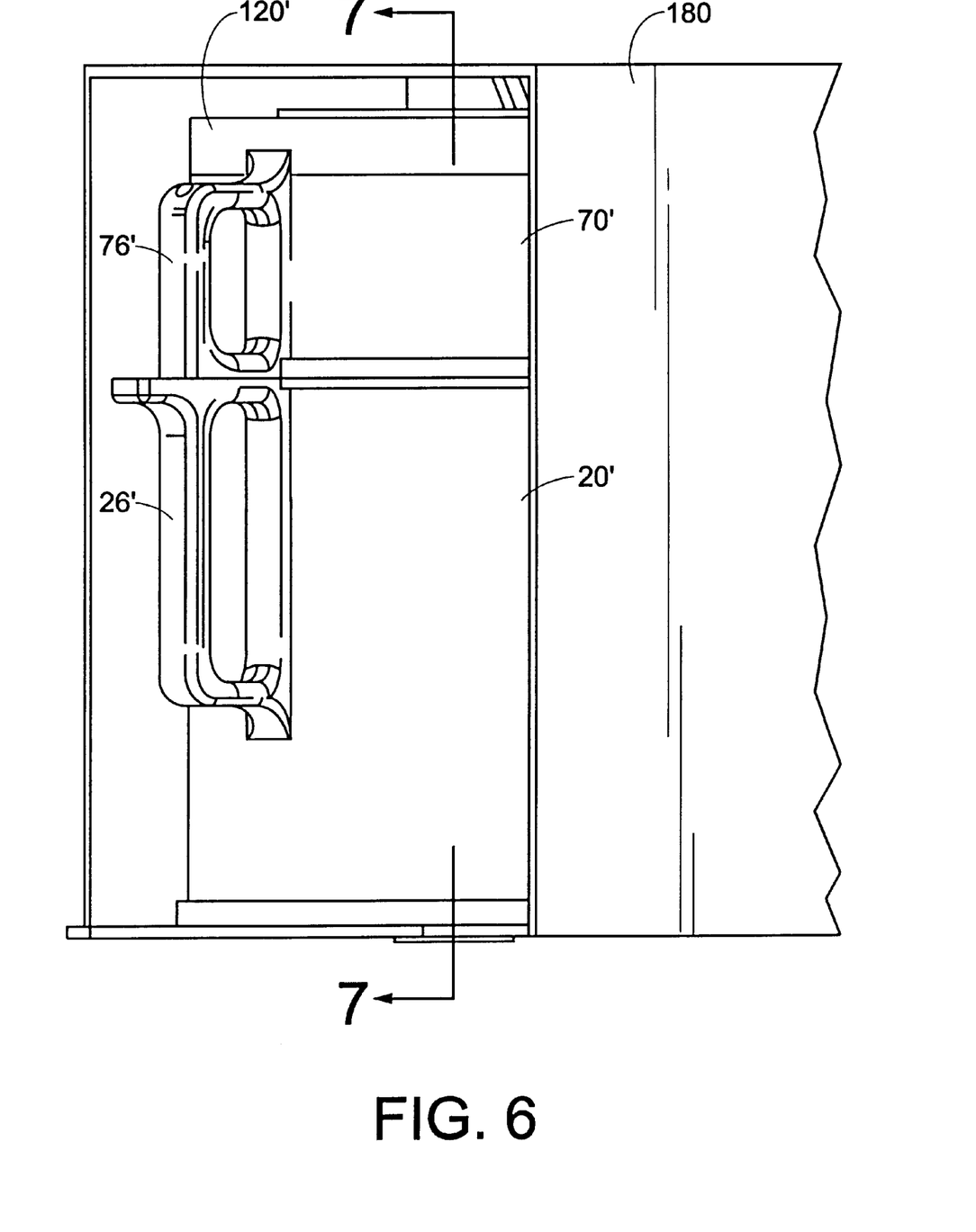
FIG. 6 is a side-elevational view of a vacuum cleaner having a two stage particle separation system according to a second preferred embodiment of the present invention.
Figure 7:
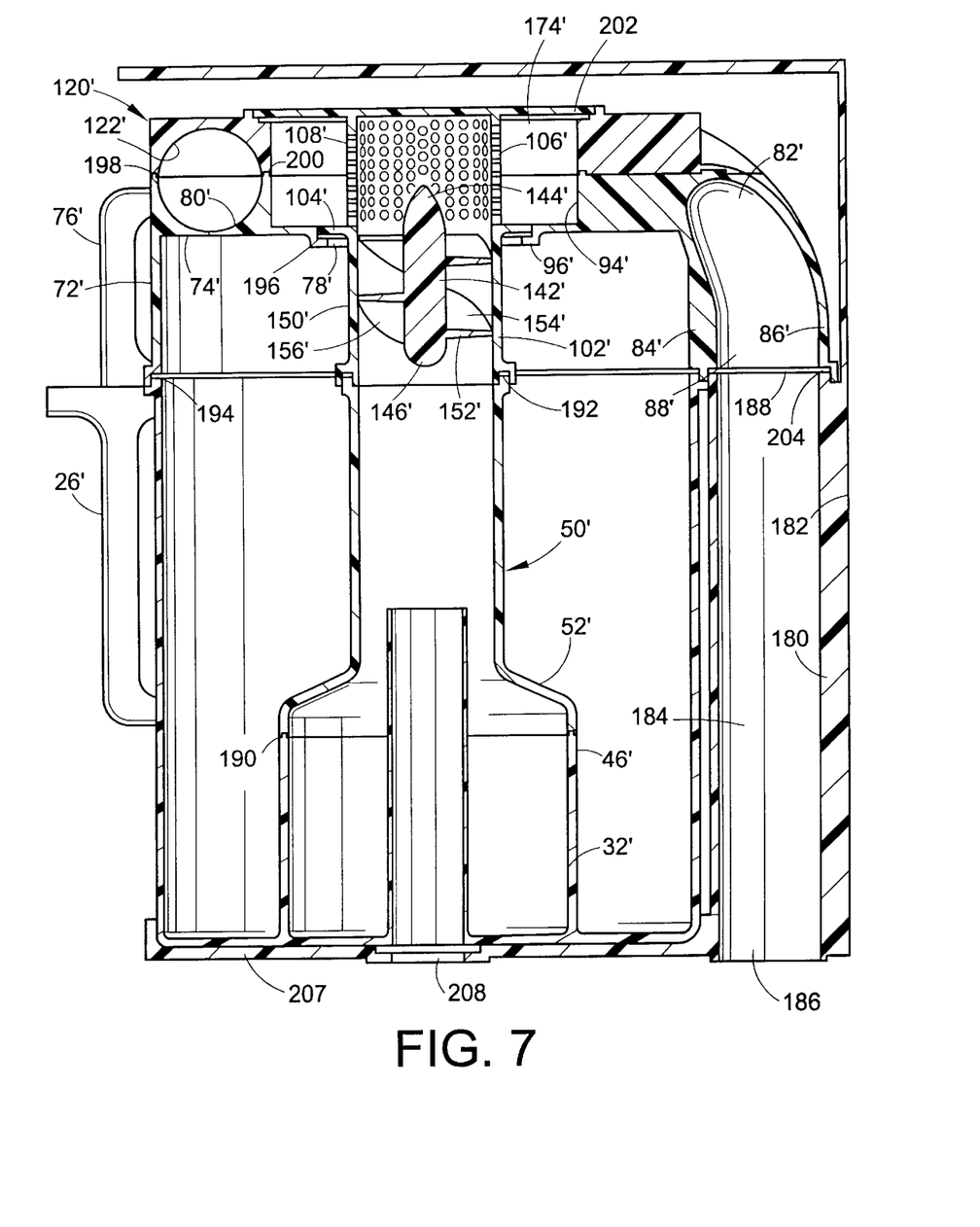
FIG. 7 is a cross-sectional view of the vacuum cleaner of FIG. 6 along line 7—7.
Figure 8:
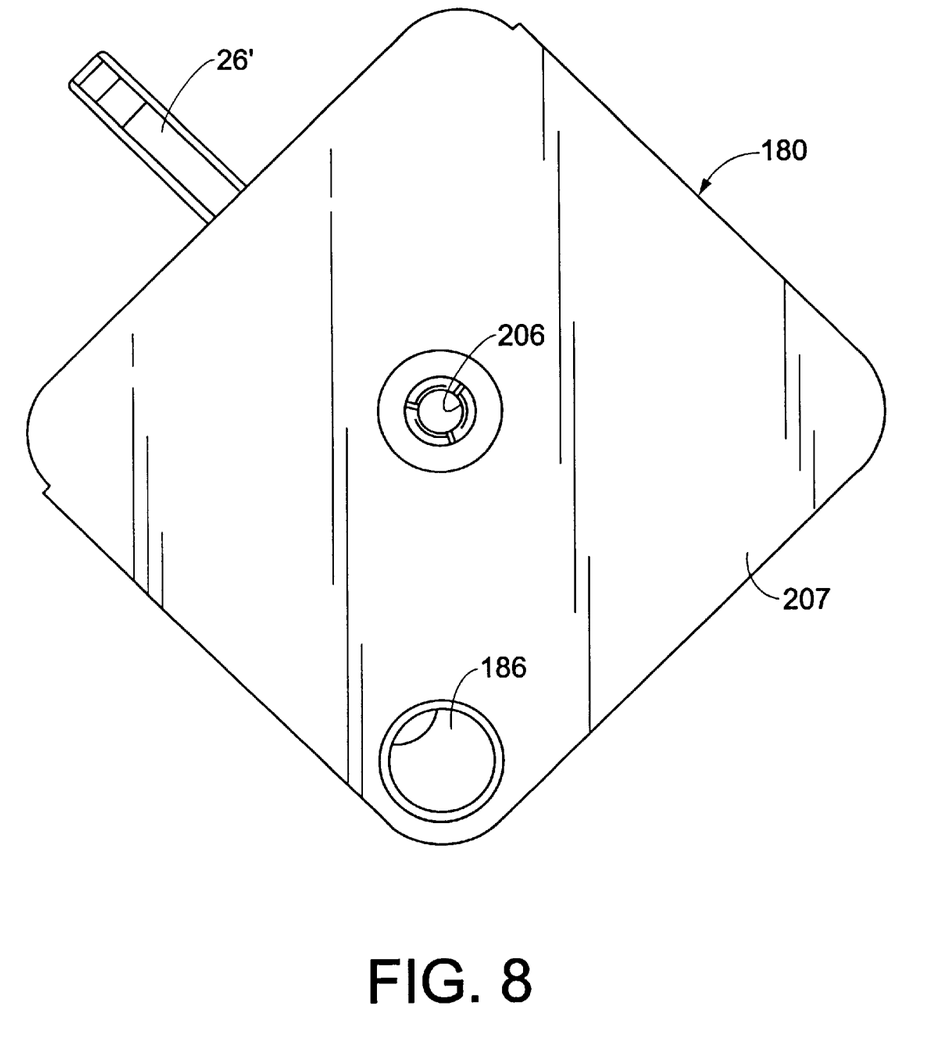
FIG. 8 is a bottom plan view of the vacuum cleaner of FIG. 6.

With reference now to FIG. 6, a second preferred embodiment of a vacuum cleaner according to the present invention is there illustrated. For ease of appreciation and understanding of this embodiment, like components are identified by like numerals with a primed (') suffix and new components are identified by new numerals. In this embodiment, there is provided a housing 180 for holding dust cup 20' which has a handle 26'. Also provided is a first separator section 70' having its own handle 76'. Further, there is provided a lid 120'. With reference now to FIG. 7, the housing 180 as a back wall 182 along which extends a conduit 184 having an inlet 186 and an outlet 188. The conduit outlet 188 communicates with an inlet port 88' of a trough 80' of a first separator section. Thus, unlike the embodiment illustrated in FIG. 3, where a separate hose is provided for connecting the floor nozzle to the dust cup assembly, in this embodiment a built-in conduit is illustrated. Moreover, in this embodiment a somewhat square dust cup housing base (FIG. 8) is illustrated instead of the approximately circular base shown in FIG. 3.

It should be appreciated that suitable gaskets or sealing elements such as o-rings could be provided at the several joints illustrated between the various elements of this inertial particle separator assembly. For example, and with continued reference to FIG. 7, a joint 190 between an upper end 46' of an outer tube 32' and the lower end 52' and a connecting conduit 50'. A similar sealing element would be provided at a joint 192 between an upper end 56' of the connecting conduit 50' and a lower end of the lower section 102' of the second separator housing section 100'. Also, a sealing element would be located at a joint 194 between an upper end of a side wall 22' of the dust cup 20' and the lower end of a side wall 72' of the first separator housing section 70'. A seal would be necessary at a joint 196 between a flange 104' of the second separator housing section and a flange 96' of the first separator housing section 70'. If desired, the lid 120' can be suitably secured to the first separator housing section 70' such as at circumferentially extending joints 198 and 200 therebetween. Alternatively, suitable sealing elements could be provided at these joints. A seal is also necessary at a joint 202 between an enlarged top end 110' of the second separator housing section 100' and a rib 126' of the lid 120'. Finally, joints between the dust cup assembly and the housing 180 need to be suitably sealed. Such joints are shown to exist at the inlet port 88' of the first separator housing section 70' as illustrated by the numeral 204, and at a central aperture 206 of the vacuum cleaner housing bottom wall 207, as illustrated by the numeral 208.

Figure 9:
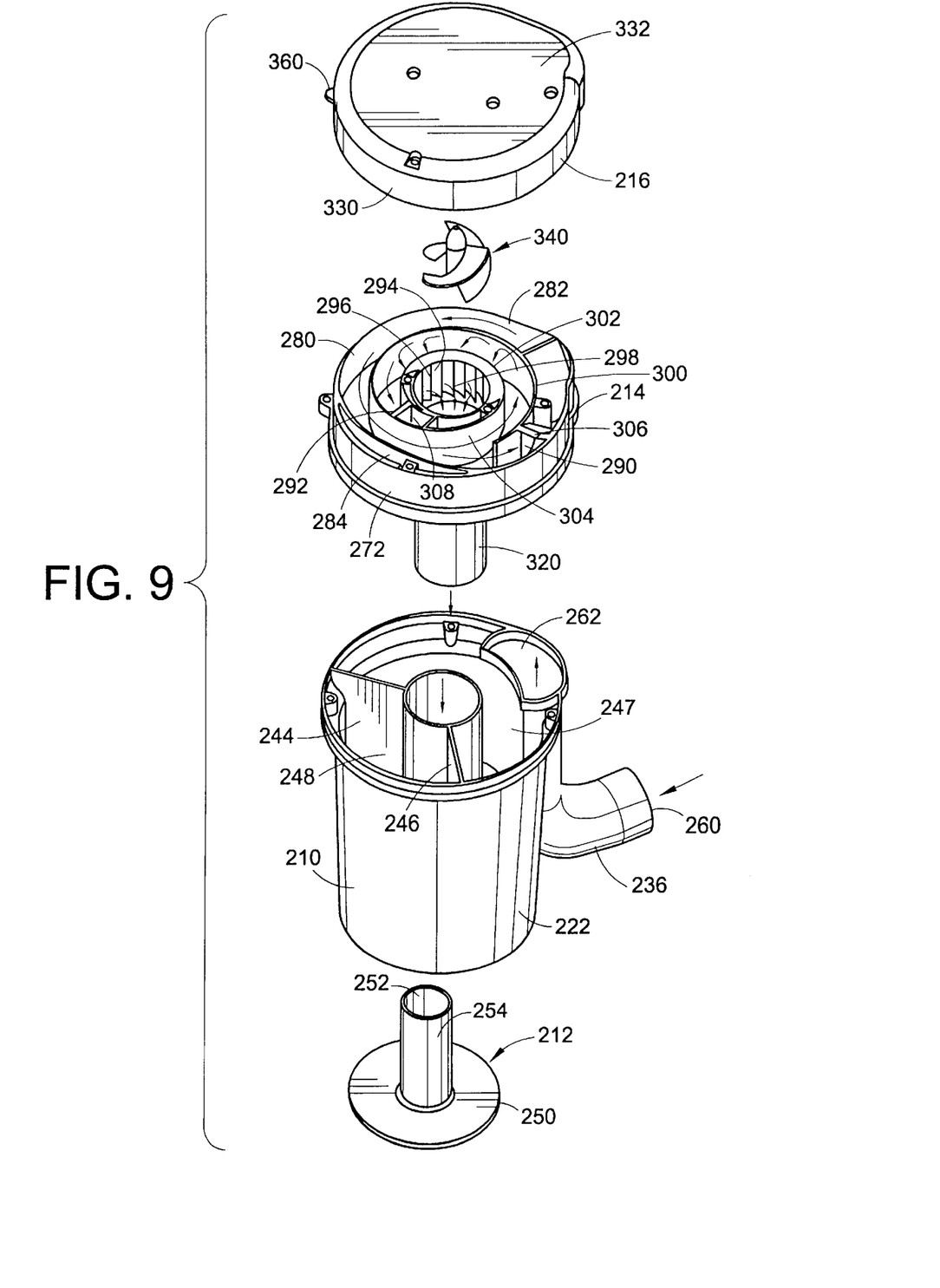
FIG. 9 is an exploded perspective view of a two-stage inertial particle separator for a vacuum cleaner according to a third preferred embodiment of the present invention.
Figure 10:
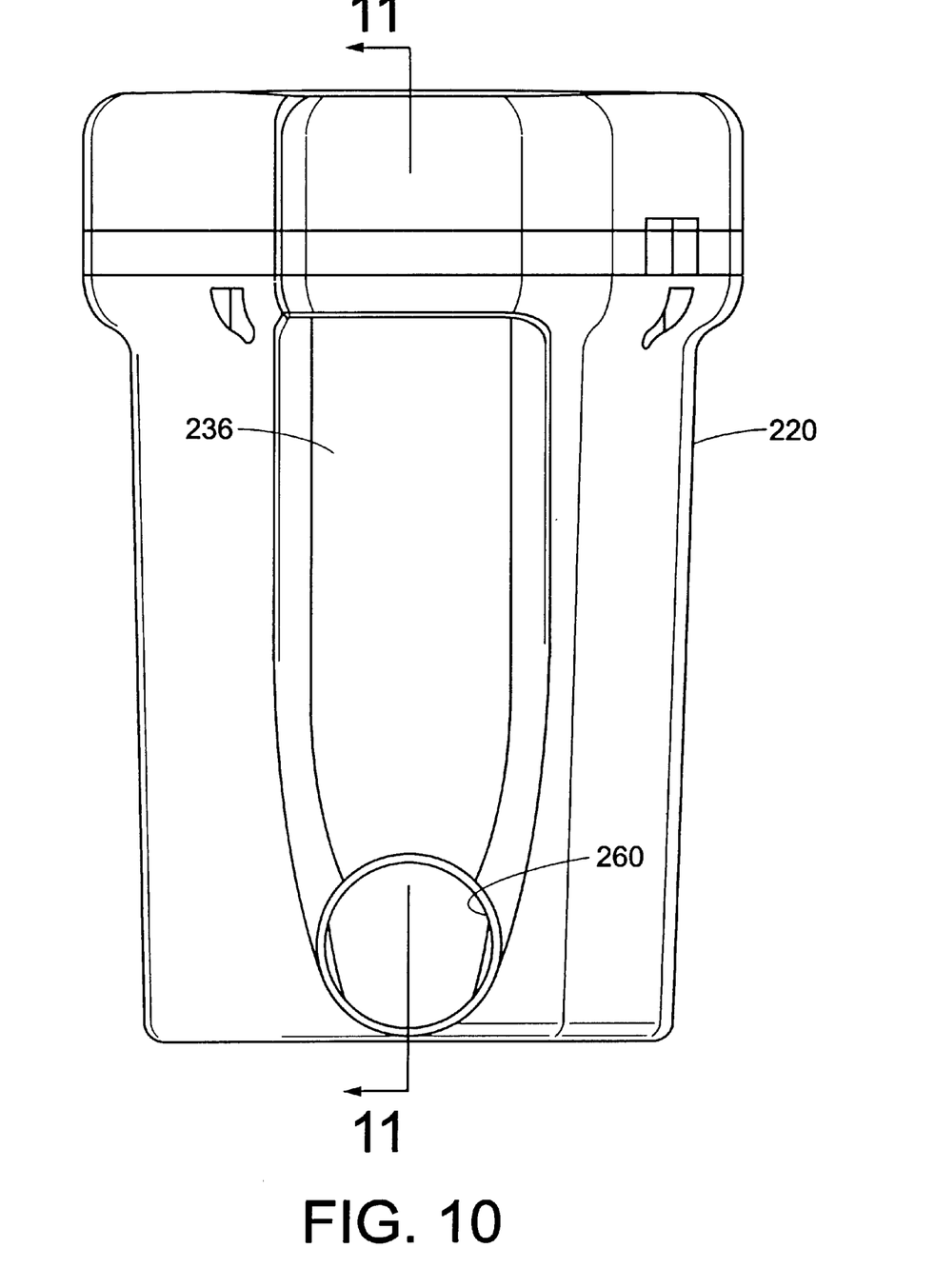
FIG. 10 is an assembled view of the separator FIG. 9.
Figure 11:
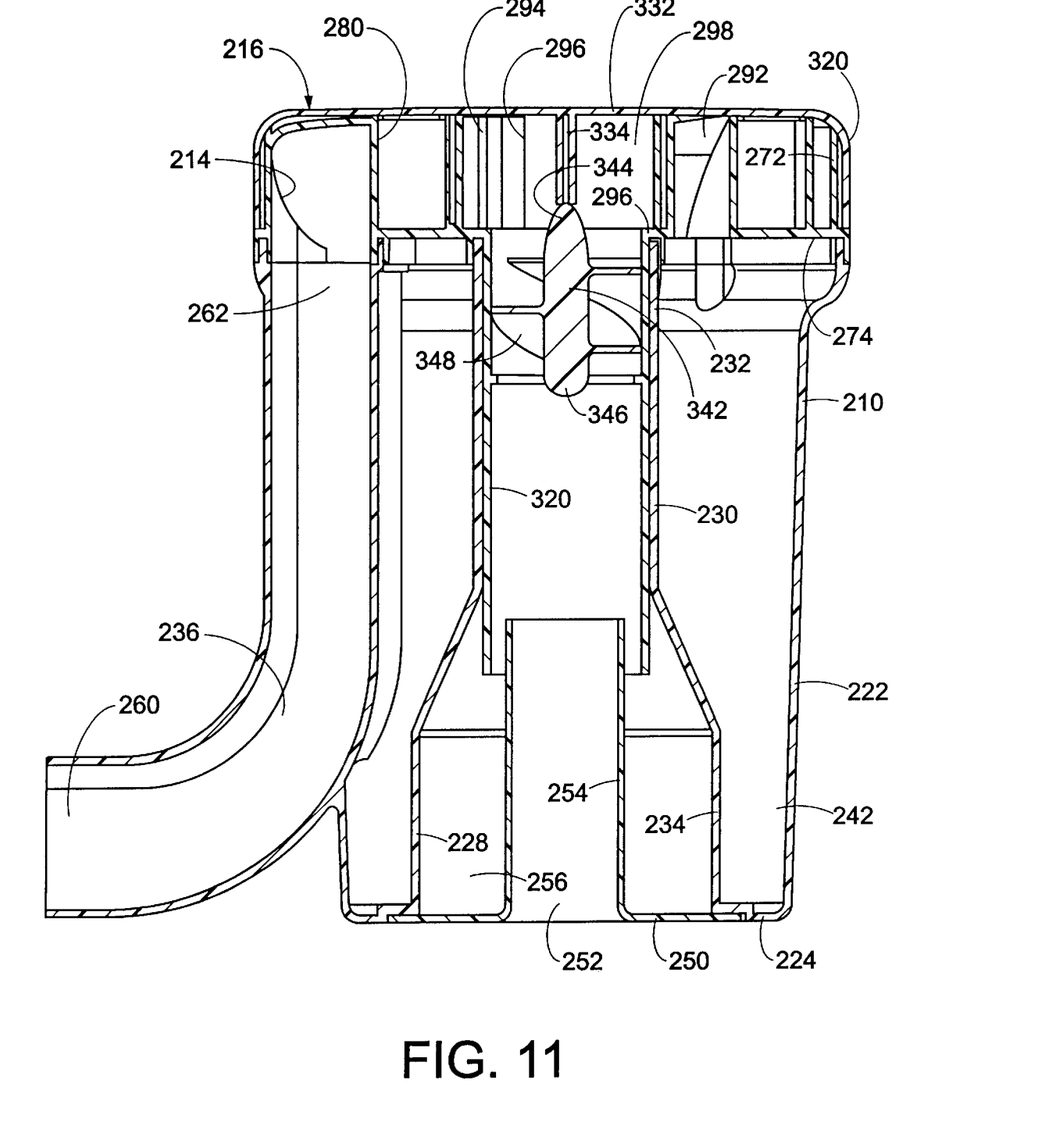
FIG. 11 is a cross-sectional view of the separator of FIG. 10 along line 11—11.

With reference now to FIG. 9, a vacuum cleaner including a second type of inertial two-stage particle separator is there illustrated. In this embodiment, the particle separator includes a dirt cup 210 having a base 212, an upper housing 214 and a lid 216. With reference now also to FIG. 11, the dirt cup includes a side wall 222 and a base wall 224. Defined in the base wall is a central aperture 228 which is encircled by a central tube 230. The central tube has a first end 232 of a first diameter and a second end 234 of a second and larger diameter. An inlet tube 236 is secured adjacent one side of the dirt cup 220. Defined in the dirt cup is a first dirt containing chamber 242. The chamber is annular and is defined by the side wall 222, bottom wall 224 and central tube 230. With reference again to FIG. 9, a first wall 244 and a second wall 246 extend from the side wall 222 to the central tube 230 in a spaced manner from each other. In this way, the first dust containing chamber 242 is divided into two sections 247 and 248.

The base 212 includes a lower wall 250 having a centrally defined aperture 252 which is surrounded by a tube 254 that protrudes from the bottom wall 250. As illustrated in FIG. 11, the base is selectively positioned in the dust cup 210 with an upper end of the tube 254 extending into a lower end of the central tube 230. Defined between the outlet tube 254 and the central tube 230 is a second dust containing chamber 256. With reference again to the inlet tube 236, in this embodiment, the inlet tube is of one piece with the dust cup 210. The inlet tube has an inlet end 260 and an outlet end 262, as best shown in FIG. 11.

The upper housing 214 includes a side wall 272 and a base wall 274 which help partially define a trough 280 having an inlet 282. An inner wall section 284 helps direct air in a spiraling manner along the trough 280. A first outlet port 290 is positioned downstream from the inlet 282 to allow particles flung outwardly by centrifugal force to fall into the first dirt containing chamber. A second outlet port 292 is positioned further downstream for those dust particles which are not separated at the first outlet port 290. The cleaned air, however, is turned at an obtuse angle at louvers 294 and flows through slots 296 into a central aperture 298. A spiraling wall 300 extends on the base wall 274 from adjacent the first outlet port 290 and spirals inwardly toward a central wall 302. Defined between these two walls is a spiraling flow path 304. The slots 296 are defined in the central wall 302.

The louvers 294 can be integral with the central wall or can be separate elements secured to the central wall. A first flow directing end wall 306 directs the dirt particles downwardly at the first outlet port 290. Similarly a second flow directing wall 308 directs dirt particles downwardly at the second outlet port 292. A tube 320 extends downwardly from the base wall around the central aperture 298. As shown in FIG. 11, the lid 216 has a side wall 330, a top wall 332 and a stem 334 extending parallel to the side wall from the top wall. The stem is centrally positioned in the lid. In this embodiment, the lid side wall 330 extends over the upper housing side wall 272 as is evident from FIG. 11.

Positioned within the tube 320 is a deflector 340. The deflector has a hub 342 with a leading edge 344 and a trailing edge 346. Several vanes 348 extend radially outwardly from the hub. The vanes are of such diameter that they contact the inner surface of the tube 320 in a friction fit. The hub leading edge 344 is positioned adjacent the stem 334 of the lid 216.

Air entrained dirt and dust particles and other items picked up by a suction to nozzle of the vacuum cleaner, such as lint, hair, threads and the like, pass through the inlet tube 236 and are deposited, via the outlet 262 thereof into the trough 280. From here, the air entrained dust and particles flow along the trough between the wall section 284 and the spiraling wall 300. The heavier particles are propelled radially outwardly by centrifugal force and fall through the first outlet port 290 and into the first section 247 of the first dust collecting chamber 242. The lighter particles still entrained in the air continue to travel along the spiraling flow path 304 and because of centrifugal force will flow out the second outlet port 292 and into the second section 248 of the first dust containing chamber 242. The air is, however, snapped back at an obtuse angle around the louvers 294 and flows through the slots 292 and into the central aperture 298.

The air is then caused to spin by the vanes 348 of the deflector 340. Any particulates still remaining in the air are pushed radially outwardly by centrifugal force and will flow downwardly adjacent the inner wall of the tube 320. These particles will fall into the second dust containing chamber 256. The now twice cleaned air will flow axially out through the outlet tube 254 and the outlet port 252.

If the vacuum cleaner is of the clean air variety, the now twice cleaned air flows towards the motor/fan of the vacuum cleaner. However, if the vacuum cleaner is of the dirty air variety, the air simply flows out through an outlet aperture of a casing of the vacuum cleaner, perhaps out through a final filter, which may be a HEPA filter. It is well known that a dirty air type of vacuum cleaner has the motor fan combination located upstream of the dust cup so that the air is blown into the dust cup. In a clean air system, air is pulled into the dust cup by a motor located downstream of the dust cup. Both types of vacuum cleaner systems are very well known in the art.

In order to clean the dust cup 210, it is removed from the housing of the vacuum cleaner. Thereafter, the lid 216 is lifted off. Preferably, the upper housing 214 is secured by conventional means to the lid and is lifted off with the lid. In the embodiment illustrated in FIG. 9, suitable cooperating ears 360 can be provided on the lid 216 and the upper housing 214 through which conventional fasteners (not illustrated) extend. The lid itself can be secured to the dust cup 210 by conventional fasteners (not illustrated). Thereafter, the dust cup 222 can be removed from the housing of the vacuum cleaner and inverted to empty the two sections 247 and 248 of the first dust containing chamber 242. In order to empty the second dust containing chamber 256, the base 212 of the dust cup is lifted away and the dust cup 210 is righted. Although not illustrated, it is apparent to those of average skill in the art that the base 212 needs to be secured by conventional means to the dust cup 210 until it becomes necessary to detach the base from the dust cup for emptying. Thereafter, the base is again secured to the dust cup and the lid 216 is similarly secured to the dust cup trapping the upper housing 214 therebetween. At this point, the dust cup is ready for reinsertion in the vacuum cleaner for further cleaning.

As with the previous embodiments, it should be appreciated that suitable gaskets or sealing elements, such as 0-rings, are preferably provided at the several joints illustrated between the various elements of the instant inertial particle separator assembly.

Thus, the present invention pertains to a two stage air separation system in which the air flow is caused to suddenly change direction in the first stage and the air is caused to spin in the second stage. Of course, it should be appreciated that both air separation stages could be designed to cause the air to spin or designed to cause the air flow to suddenly change direction. However, the preferred embodiments disclosed herein have been found particularly advantageous from the standpoint of providing a relatively compact system adapted for use in vacuum cleaners, such as upright or canister vacuum cleaners.

The invention has been described with reference to several preferred embodiments. Obviously, modifications and alterations will occur to others upon the reading and understanding of the preceding specification. It is intended that the invention be construed as including all such alterations and modifications insofar as they come within the scope of the appended claims or the equivalents thereof.

What is claimed is:

1. A vacuum cleaner comprising:
   a housing,
   a nozzle in fluid communication with said housing;
   a suction source held by said housing, said nozzle being in fluid communication with said suction source; and
   a dust separation system communicating with said housing, said dust separation system comprising:
   an inlet in fluid communication with said nozzle,
   a first inertial dust separation stage positioned downstream from said inlet, wherein said first stage causes a sudden change in a direction of air flow to separate dust from an air stream flowing through said first separation stage,
   a second inertial dust separation stage located downstream from said first inertial dust separation stage,
   a dust containing chamber located adjacent said first and second inertial dust separation stages for holding the dust separated by at least one of said first and second inertial dust separation stages, wherein said dust containing chamber comprises a dust cup and further comprising a lid which is selectively positioned on said dust cup, and
   an outlet located downstream from said second inertial dust separation stage.

2. The vacuum cleaner of claim 1 wherein said first dust separation stage comprises:

an airflow channel;

a first dust outlet communicating with said airflow channel; and a clean air outlet communicating with said air flow channel.

3. The vacuum cleaner of claim 2 wherein said first separation stage further comprises a second dust outlet communicating with said air flow channel, said second dust outlet being located downstream from said first dust outlet.

4. The vacuum cleaner of claim 2 wherein said clean air outlet of said first separation stage comprises a plurality of louvers separated by slots.

5. The vacuum cleaner of claim 4 wherein an upstream edge of each of said plurality of louvers protrudes into said flow channel.

6. The vacuum cleaner of claim 1 wherein said second separation stage comprises:

a first tube having a lower end, wherein said first tube has a first diameter; and a second tube having an upper end, wherein said second tube has a second diameter which is smaller than said first tube first diameter and wherein said second tube upper end protrudes into said first tube lower end forming an annular space therebetween.

7. The vacuum cleaner of claim 1 wherein said dust cup further comprises a base wall in which said outlet is defined.

8. The vacuum cleaner of claim 7 further comprising a securing element for selectively securing said base to said dust cup.

9. A vacuum cleaner comprising:

a housing;

a dust separation system communicating with said housing, wherein said dust separation system comprises:

a dirty air inlet;

a first inertial dust separation stage positioned downstream from said dirty air inlet, wherein said first dust separation stage includes a flow channel and a clean air outlet positioned in a wall of said flow channel to cause a rapid change in a direction of air flow, a second inertial dust separation stage positioned downstream from said first dust separation stage, wherein said second dust separation stage comprises a deflector, a dust containing area which communicates with at least one of said first dust separation stage and said second dust separation stage, and a clean air outlet located downstream from said second dust separation stage.

10. A vacuum cleaner of claim 9 wherein said deflector comprises:

a hub; and a plurality of vanes radiating outwardly from said hub in circumferentially spaced orientations.

11. A vacuum cleaner of claim 9 wherein said first inertial dust separation stage further comprises a first dust outlet communicating with said flow channel.

12. The vacuum cleaner of claim 11 wherein said first dust outlet is located downstream from said clean air outlet.

13. The vacuum cleaner of claim 9 wherein said second inertial dust separation stage further comprises a first tube in which said deflector is positioned.

14. The vacuum cleaner of claim 13 wherein said second inertial dust separation stage further comprises a second tube having a smaller diameter than a diameter of said first tube and wherein said second tube has an upper end which protrudes into a lower end of said first tube thereby forming an annular space therebetween.

15. A vacuum cleaner comprising:

a housing;

a nozzle communicating with said housing; and a dust separation system communicating with said housing, wherein said dust separation system comprises:

a dirty air inlet communicating with said nozzle, a first inertial dust separation stage positioned downstream from said dirty air inlet, a first dust containing chamber communicating with said first dust separation stage for holding dust separated, by said first dust separation stage, from an air stream flowing through said dust separation system, wherein said first dust separation system comprises a flow channel and a clean air outlet located in a wall of said flow channel to cause a sudden change of direction of an air flow through said flow channel, a second inertial dust separation stage positioned downstream from said first inertial dust separation stage, a second dust containing chamber communicating with said second inertial dust separation stage for holding dust separated by said second dust separation stage from the air stream flowing through said dust cup, and an outlet located downstream from said second dust separation stage.

16. The vacuum cleaner of claim 15 wherein said first inertial dust separation stage further comprises a first dust outlet communicating with said flow channel.

17. The vacuum cleaner of claim 15 wherein said clean air outlet includes a plurality of louvers separated by slots.

18. The vacuum cleaner of claim 15 wherein at least one of said first and second dust containing chambers are defined in a dust cup and further comprising a lid which is selectively secured to said dust cup.

19. The vacuum cleaner of claim 18 further comprising a securing element for selectively securing said dust cup to said housing.

20. The vacuum cleaner of claims 18 wherein said first inertial dust separation stage is defined by a housing selectively positioned on said dust cup.

21. A vacuum cleaner comprising:

a main housing;

a nozzle communicating with said main housing;

a dust separation system selectively secured to said main housing, said dust separation system comprising:

a housing section comprising a first inertial dust separation stage which communicates with said nozzle and a second inertial dust separation stage positioned downstream from said first inertial dust separation stage, a dust cup having a side wall and an open top communicating with at least one of said first and second inertial dust separation stages, and an outlet located in said dust cup, wherein said housing section is selectively mounted on said dust cup.

22. The vacuum cleaner of claim 21 further comprising a lid selectively mounted on said housing section.

23. The vacuum cleaner of claim 21 further comprising a base selectively mounted on said dust cup.

24. The vacuum cleaner of claim 23 wherein said outlet is located in said base.

25. The vacuum cleaner of claim 24 wherein said base comprises an outlet tube in which said outlet is defined.

26. The vacuum cleaner of claim 21 wherein said dust cup further comprises a central tube extending along an axis of said dust cup.

27. The vacuum cleaner of claim 21 further comprising:

a first tube extending downwardly from adjacent an upper end of said dust cup, a second tube extending upwardly from adjacent a lower end of said dust cup, wherein said first tube has a first diameter and said second tube has a second diameter which is smaller than said first diameter, wherein said first tube has a lower end which covers an upper end of said second tube, and an annular space defined between said first tube lower end and said second tube upper end.

* * * * *